Figure 1:
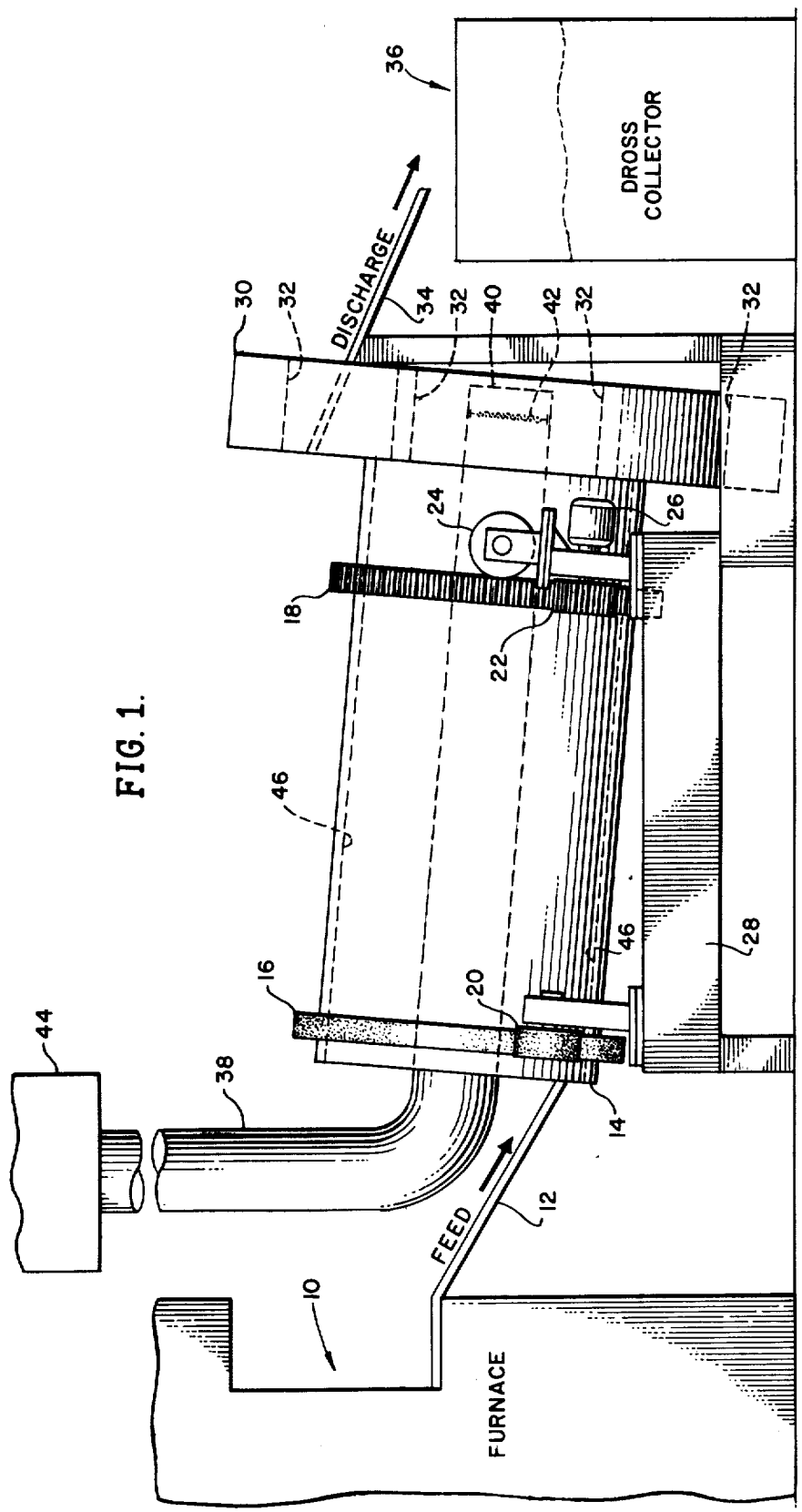

United States Patent [19]

Papafingos et al.

[11] 4,039,173
[45] Aug. 2, 1977

[54] ALUMINUM DROSS RECOVERY METHOD

[75] Inventors: Pandelis N. Papafingos; Richard T. Lance, both of Riverside, Calif.

[73] Assignee: Alumax Mill Products, Inc., Riverside, Calif.

[21] Appl. No.: 731,071

[22] Filed: Oct. 8, 1976

Related U.S. Application Data

[62] Division of Ser. No. 625,286, Oct. 23, 1975.

[51] Int. Cl.$^2$ .............................................. C22B 21/00
[52] U.S. Cl. .................................. 266/201; 266/227; 266/145
[58] Field of Search ............... 75/24, 30, 61, 63, 68 R, 75/86; 266/137, 201, 227, 232, 241, 287, 145

[56] References Cited

U.S. PATENT DOCUMENTS

| 1,253,539 | 1/1918 | Seacrist | 75/24 |
| 1,615,009 | 1/1927 | Frost | 75/68 R |

Primary Examiner—Gerald A. Dost
Attorney, Agent, or Firm—Knobbe, Martens, Olson, Hubbard & Bear

[57] ABSTRACT

Dross, principally oxides and nitrides of aluminum and entrained metallic aluminum, is transferred quickly from the melting furnace to a cooling drum and cooled in less than 3 minutes to below 400° F. without substantial removal of metallic aluminum before recovery of metallic aluminum.

3 Claims, 1 Drawing Figure

ALUMINUM DROSS RECOVERY METHOD

This is a division of application Ser. No. 625,286, filed Oct. 23, 1975.

This invention relates to the treatment of active metal dross, slags and skimmings to recover metallic values. The method is applicable to aluminum and to zinc processing, and, in the exemplary case of aluminum, relates to a method of cooling and breaking up of larger pieces of aluminum dross while retaining entrained aluminum metal to give an improved recovery of metal values.

Active metal alloys, e.g. aluminum and zinc, aluminum being given in the exemplary disclosure herein, whether in solid or molten forms are covered with oxide skins. The coating consists of aluminum oxides, carbides and nitrides and frequently of sulfides. Since aluminum oxide is the major constituent of the film, it is referred to generally as the aluminum oxide film, with the understanding that the film also includes, depending on the oxidation circumstances, carbides, nitrides, etc. If the oxide film of molten aluminum is ruptured, it reforms immediately. Repetitive formation resulting from mixing, pouring, or otherwise handling molten aluminum so as to expose new surface and results in a thick layer of oxides in which large or small globules of molten aluminum are entrained. The formation of excessive amounts of oxides and the entrainment of metallic aluminum in the oxides presents a serious problem in the aluminum industry. It is necessary, in the course of melting down aluminum ingots, scrap aluminum and the like, to scrape dross from the surface of the body of molten aluminum. Removal of aluminum dross or skimmings carries with it a large amount of molten aluminum, much of which is entrained in the dross and protected from further oxidation. Much of the metallic aluminum, however, is merely attached to the oxide clumps and is exposed to the air. When the aluminum dross, or skimming, is removed from the furnace, it is at a temperature about 1200° F. and any molten aluminum which is exposed to air is very vulnerable to rapid oxidation. In fact, since oxidation by itself generates heat, the molten or semi-molten mixture catches fire as it oxidizes, a phenomena caled Thermitting or aluminothermic reaction.

Present methods of handling aluminum include processes which encourage Thermitting to maintain the dross and aluminum at high temperatures to allow aluminum metal to drain out and separate from the dross and methods in which aluminum dross is comminuted during cooling to permit aluminum metal to drain from its entrained condition in the dross.

In addition to the substantial loss of aluminum by the Thermitting action, large amounts of "smoke," finely disbursed particles of aluminum oxide carried in the air, are generated presenting health and other problems.

In one early method of treating aluminum dross, Frost, U.S. Pat. No. 1,615,009, aluminum dross is transferred to a trough having an upward inclination from the point of entry of the dross. Inside the trough is a mechanical conveyor which moves the dross upwardly, with agitation and comminution to permit the aluminum metal to be drained from the dross and recovered from an outlet at the bottom of the trough. The trough is cooled to bring about some cooling of the dross but is comminuted before the cooling takes effect to remove molten aluminum. The inherent result, as the aluminum is removed and coagulates and eventually drains off, is to cause substantial additional oxidation of the metallic aluminum.

Another approach to the recovery of aluminum dross is illustrated by Hielman et al, U.S. Pat. No. 2,481,591, in which there is disclosure to the effect that by maintaining an exothermic reaction with air, a higher recovery of the metal can be obtained. Stroup et al, U.S. Pat. No. 2,754,199, describes still another approach in which freshly skimmed aluminum dross is agitated in a non-oxidizing atmosphere containing aluminum chloride.

Brumagin, U.S. Pat. No. 2,901,110, and Brumagin et al, U.S. Pat. No. 3,417,930, disclose vibratory conveying tables which are used in dross recovery methods. In actual use, dross is drawn into a large shaker box where thermitting is encouraged and molten metal is separated by shaking. The remaining dross is loaded onto the cooling conveyor which carries the dross into contact with a breaker which breaks the lumps into small particles to accelerate cooling. The violent shaking of the dross causes further separation of the molten aluminum, and subsequent beating of the dross provides additional separation. Inherent in this process wherein metallic molten aluminum is separated from the dross is the exposure of new surfaces as the aluminum flows, coagulates, and changes form or shape with the result that additional aluminum is oxidized before the metal solidifies. There are additional major disadvantages to the Brumagin et al approach. First, there is te loss of metal from thermitting. Secondly, the cooling is not as rapid as may be desired and very long cooling troughs are required. These troughs are very expensive and may extend or be located hundreds of yards from the furnace. This requires much plant space and makes arrangement of equipment and adequate lanes for travel between and around the equipment difficult and expensive. In addition, since a very long exposed tray is required to bring the dross to a suitably cooled state, very large amounts of smoke are formed. It is often necessary to place large hoods with high volume suction apparatus over the entire tray to minimize loss of small particles and exposure of workers adjacent the equipment and at other parts of the plant to the aluminum oxide smoke.

In all of these approaches, a central concept is to remove as much molten metallic aluminum from the dross as possible as quickly as possible through vibration, comminution, etc., accompanied by cooling or heating in the varios processes. In all cases, metallic aluminum is caused to flow with consequent added exposure of the fresh aluminum metal surface to the air and consequent continued oxidation, with resultant decrease in recoverable metallic aluminum in the dross.

One alternative is to cover the dross with a flux material or an inert atmosphere to prevent continued oxidation of the metal. While this is one effective approach to reduce continued loss of aluminum metal during recovery, it is expensive and complicated and requires highly specialized equipment and additional man power for monitoring and opertion.

The present invention approaches the problem from an entirely different concept. According to the present invention, as much aluminum metal is retained in the dross as is possible consistent with extremely rapid cooling to a temperature below which continued thermitting and oxidation is prevented.

A system is disclosed for recovering aluminum dross in which the aluminum dross is fed directly from the melting furnace to one end of the cooling cylinder, without significant cooling of the dross in route, such that the dross reaches the cooling cylinder at a temperature of more than about 1000° F. The dross is cooled to a temperature of less than 400° F. in a time period of preferably one to two minutes and generally in less than three minutes, very much shorter than is accomplished in the prior art.

The cooling means comprises a portable cylinder which has an internal cylindrical cooling surface. The cooling surface is chilled, by water spray, water bath or other convenient means, and rotated during the cooling cycle. Means are provided at the other end of the cylinder to remove the cooled dross. The cooling cylinder is constructed and configured so that, when in operation, the hot dross received at one end of the cylinder is lifted by rotation of the cylinder with the dross in direct contactwith the cooled surface. The dross rolls or tumbles onto another portion of the cooled surface and is simultaneously conveyed longitudinally to the other end of the cylinder. The dross arrives at the other end of the cylinder at a temperature of no more than about 400° F. in a time period of less than about three minutes from the time the dross was first received in the cooled cylinder. Concurrently with the conveying and cooling of the dross, small particles, less than 24 mesh Tyler screen size, are removed. The dross when removed from the other end of the cylinder contains substantially all of the original metallic aluminum still in metallic form. In the preferred embodiment, the cylinder is tilted downwardly from the receiving end to the discharging to effect the conveying of the dross during cooling, and lifting blades are secured along the internal surface of the cylinder to aid in the lifting of the dross in contact with the cooled cylindrical surface.

In the following description of the process and system of this invention and the apparatus illustrated in the drawing, reference is made specifically to aluminum and to a single preferred embodiment of the invention. The invention, however, encompasses the use of the same process and system for removal of dross from zinc and also encompasses variations from the preferred embodiment, which is merely exemplary of the invention and is not limited to circumscribe or to define the invention.

In the drawing:

FIGURE is a side plan, partially schematic, view of an apparatus and system for carrying out the process of the invention.

The inventive process can be best described in connection with the exemplary system illustrated in the drawing. The dross, a term which includes skimmings, slags, etc., is removed directly from the furnace 10 by feed means 12 into the cooling cylinder. The feed means may be simply an inclined chute, which may or may not be vibrated according to choice, length, ambient temperature and other factors, or may be a more complicated feed mechanism such as an affirmative conveying system. In any event, the chute or other feed system is made as short as is possible to transfer the dross directly and quickly from the furnace to the cooling means without substantial cooling of the dross enroute.

The cooling means includes a cylinder 14 with appropriate supporting and guide rings or tires 16 and gears or sprockets 18 by which the cylinder is supported by a pair of supporting roller assemblies 20, near the input end of the cylinder and roller assemblies 22 and 24 near the output of the cylinder, the other half of each pair not being shown. In the exemplary illustration of a system for practicing the invention, the guide rings are gears and the roller assemblies are driven by belts, electric motors or other drive means as indicated at 26. Any drive means may be used to rotate the cylinder 14, however. This is a conventional means for mounting and rotating drums. The cooling means also includes a tank 28 which underlies the drum and contains a coolant, such as water. The water may be maintained at any desired temperature using conventional circulating and refrigerating or other cooling techniques. The coolant from the tank is sprayed or otherwise applies to the cooling drum or portions of the cooling drum may be rotated in the tank. A combination of means for cooling the drum may be used. Alternatively, the drum may include a water jacket through which cooling water or other liquid is circulated. Other cooling means may also be used.

Attached to the other end of the drum, or in association therewith, is a circular, short cylindrical section 30 which includes a number of paddle or blade like lifting mechanisms indicated at 32. A discharge chute or other discharge mechanism 34 extends into the open end of the lifting cylinder 30. The discharge chute may be of any desired length or configuration since the dross is at a temperature of less than 400° F., and consequently additional oxidation does not occur by the time the dross reaches the discharge chute. Affirmative conveying mechanisms may be used in lieu of the chute if desired. In the illustrated embodiment, the cooled dross is simply collected into a car or bin indicated generally at 36 for storage and transport as may be convenient in the particular plant.

Fine particles are removed by air evacuation through a large conduit 38. The particles are screened through a 24 mesh (Tyler) screen having sieve openings of 0.0276 inch, 0.701 mm, (Tyler standard screen sieves, W.S. Tyler Company, Cleveland, Ohio), or some equivalent screening device. The conduit may be perforated along the sides or closed on the sides and open only at the distal end 40 with the screen 42 located adjacent the end. If a perforated conduit is used, then the screen would cover each of the perforations along the length of the conduit.

In the preferred embodiment, the conduit 38 is connectable to a conventional exhaust and filter system, as indicated at 44, with openings located at strategic points through the plant or is connected to a single evacuation-filtering system by means of a flexible conduit connector so as to permit connection of the evacuation at various locations. Power drive mechanisms, cooling fluid and other connectors are preferably of the easy connect disconnect type so that a single cooling system can be used in connection with several furnaces simply by moving the cooling drum assembly to the appropriate location by means of a fork lift, or by placing the cylinder system on casters.

Also in the preferred embodiment, the cylinder is tilted at an angle of from about 2° to about 15° downwardly from the receiving end to the discharging end to effect conveying of the dross during cooling steps and lifting blads 46 are located at spaced intervals around the inside cooling surface of the cylinder extending longitudinally along the cylindrical surface. These lifting blades aid in lifting the dross in intimate contact with the cooled cylindrical walls in contact with the cooled cylindrical surface to effect rapid and effective cooling with minimum separation of aluminum and to also break up the larger chunks of dross.

The present invention, instead of monitoring high temperatures or maintaining the same, or even favoring the same, through Thermitting, is based upon the principal of extremely rapid cooling without substantial separation of aluminum metal from the dross. The drosses, skims, slags and the respective mixtures, are subjected to immediate cooling almost from the moment they leave the furnace or furnace well. The material is moved rapidly into the cooling drum. The inside lifters break the larger chunks of the skim up into smaller pieces for further rapid cooling. The rotation of the drum, external cooling of the surface, the lifting and rolling or tumbling of the dross against the cooled surface inside the cooling drum, all result in immediate cooling of the mixture. Since the agitation of the chunks is comparatively mild, as compared for example with the Brumagin et al process, minimum loss of aluminum metal from the dross mixture per se occurs.

The temperature of the drosses, skimmings, or slags is in the area of 1200° to 1400° F. coming from the furnace or furnace well and will arrive on the cooling surface of the cylinder at above about 1000° F. but are dropped down immediately to about 400° F. within a minute or two, preferably and always in less than about 3 minutes. This rapid cooling stops the formation of oxides and results in vastly improved aluminum recoveries. The prior art methods maintain drosses in the area of 1200°-1400° for 10 to 20 minutes. Even those methods which involve some cooling maintain the drosses at well above 400° F. for long periods of time during which extensive formation of oxides occur.

As the drosses, skims, slags are introduced into the cooling drum, they solidify at first, since oxides have a higher melting point than molten aluminum. Some aluminum separates in the form of small beads which cool immediately as they freeze around the inside of the cooling drum along the surface, but most of the aluminum remains intimately entrained in the dross.

This same mechanism can be used for drosses, slags, skimmings, and salt or other skimmings containing large percentages of salts, cover fluxes, or other salt mixtures. The basic principle is the same, a rapid freeze of the salt cakes or slags which stops the oxidation of metallic aluminum. The final size and form of the salt cake or slag can be controlled by the length of the cylinder, the number and shape of the blades inside the cylinder and by the rate of rotation of the cylindrical surface.

Drosses issued from such treatment yield comparatively high recovers, often as high as 30% or more above recoveries accomplished in the prior art. The metal content is not only found in the high metal recoveries from the dross per se but is also present in various mesh levels of the dust. The dust had no value in prior art methods but, containing comparatively high levels of finely divided aluminum metal, has, as a result of this invention, become a valuable by-product material and is used in the steel refining process.

Drosses treated by prior art techniques, e.g. the Brumagin technique, showed a recovery of 40-45% of the aluminum metal, whereas approximately 800,000 pounds of dross processed through the present invention yielded from 70-75% of the aluminum present.

A study of various levels of dust from previous dross recovery methods were submitted to chemical analysis, the analysis consisting of treating the drosses with caustic soda, where free aluminum reacts with caustic soda, and evolution of hydrogen is then measured by way of water displacement.

The results of such analysis show in every instance that the rapid cooling of this invention produces substantially richer cuts of skimming or drosses. Such results are possible because the invention does not allow the metal to burn in the air or oxidize during slow cooling yielding large amounts of aluminum oxide at the expense of the more valuable aluminum metal.

Instead, as a result of this invention, aluminum is protected from rapid oxidation and its presence is detected at higher levels in all sizes of drosses and skimmings.

The results of comparative runs is shown in Table I.

TABLE I

| Aluminum Metal Recovery - High Salt Content Dross | | |
|---|---|---|
| | Aluminum Metal Content | |
| Particle Size | Prior Art (%) | Invention (%) |
| −24 Mesh (Tyler) | 28.9% Al. | 63.5% Al. |
| +24 Mesh (Tyler) | 28.8% Al. | 81.0% Al. |

Drosses or slags that are treated in furnace salt wells and which contain large amounts of salt usually are discarded. They contain, however, between 25 and 35% aluminum which is wasted, in the prior art. This invention permits the removal of about half of the aluminum from such drosses and slags before the balance of the drosses and slags are discarded. The importance of this invention cannot be minimized when one realizes that drosses, slags and skimmings represents millions of tons of aluminum per year.

The same methods and apparatus and systems as described above were used in connection with zinc for instance, with substantially the same results.

While the most important and valuable aspect of this invention resides in the unexpectedly great improvement in aluminum recovery from drosses, skimmings, and the like, the invention has many other advantages. Since the cooling system can be moved from one location to another by means readily available in industrial plants, e.g., lift trucks or forklifts, or by mounting the cooler on casters, there is a great saving in floor space. This saves time of workmen in moving through the plant and, more importantly, permits a higher efficiency use of plant space. Alternatively, an individual cooling system can be provided with each furnace for approximately the same cost as is required to provide an Ajax cooler (Brumagin et al) for each eight to ten furnaces. Considerably less floor space is used also.

The foregoing advantages accrue from the utilization of the invention defined in the following claims and the description of the exemplary embodiments, techniques, steps and structures hereinbefore is not limiting of the invention and a reasonable range of equivalent steps, materials and apparatus is contemplated within the scope of the invention.

What is claimed is:

1. A system for recovering dross values comprising, in combination:
    means for feeding dross directly from a melting furnace to one end of cooling means without significant cooling enroute such that the dross reaches the cooling means at a temperature of more than about 1000° F.;
    means for cooling the dross to less than 400° F. in less than 3 minutes comprising a portable cylinder having an internal cylindrical cooling surface, means to chill said surface, means to rotate said cylindrical surface;

the cooling means being so constructed and configured and being so operated when in use as to receive the hot dross at one end of the cylindrical cooling surface, lift the dross by rotation of the cylinder with the dross in contact with said surface, tumble the dross onto said cooling surface and convey the dross to the other end of the cylinder all simultaneously, the dross arriving at the other end of the cylinder at a temperature of no more than about 400° F. within less than about 3 minutes from the time the dross was first received on the cooled cylindrical surface;

means for removing particles which are smaller than openings in a 24 mesh Tyler screen while the dross is being cooled; and means for removing the cooled dross from the other end of the cylinder at a temperature of no more than 400° F., said dross containing substantially all of the originally contained metallic constituent integrally retained in said dross as the metal.

2. In the system defined in claim 1, the improvement wherein the cylinder is tilted at an angle of from about 2° to about 15° downwardly from the receiving to the discharging end to effect the conveying of the dross during cooling.

3. In the system defined in claim 2, the improvement wherein lifting blades are secured longitudinally along the cylinder surface.

* * * * *